US008091120B2

(12) United States Patent
Perrella et al.

(10) Patent No.: US 8,091,120 B2
(45) Date of Patent: Jan. 3, 2012

(54) ADAPTIVE AUTHENTICATION METHODS, SYSTEMS, DEVICES, AND COMPUTER PROGRAM PRODUCTS

(75) Inventors: Ronald Perrella, Norcross, GA (US);
Barrett Kreiner, Woodstock, GA (US);
Samuel Bailey, Jr., Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1061 days.

(21) Appl. No.: 11/314,310

(22) Filed: Dec. 21, 2005

(65) Prior Publication Data

US 2007/0143832 A1    Jun. 21, 2007

(51) Int. Cl.
*H04L 9/32* (2006.01)
*G06F 9/44* (2006.01)
*G06F 15/16* (2006.01)

(52) U.S. Cl. ............ 726/5; 709/227; 709/228; 709/229; 709/230; 713/168; 717/117; 719/315; 719/316

(58) Field of Classification Search ........................ 726/5
See application file for complete search history.

(56) References Cited

U.S. PATENT DOCUMENTS

| | | | |
|---|---|---|---|
| 6,321,339 B1 | 11/2001 | French et al. | |
| 6,775,782 B1 | 8/2004 | Buros et al. | |
| 6,823,452 B1 | 11/2004 | Doyle et al. | |
| 6,918,041 B1 * | 7/2005 | Chen | 726/14 |
| 7,117,359 B2 * | 10/2006 | Wood et al. | 713/155 |
| 7,424,608 B1 * | 9/2008 | Cherukumudi et al. | 713/156 |
| 7,483,994 B1 * | 1/2009 | Stephens et al. | 709/230 |
| 7,506,365 B2 * | 3/2009 | Hirano et al. | 726/5 |
| 7,627,751 B2 * | 12/2009 | Ikenoya | 713/158 |
| 7,644,275 B2 * | 1/2010 | Mowers et al. | 713/168 |
| 2002/0143944 A1 * | 10/2002 | Traversat et al. | 709/225 |
| 2003/0033524 A1 * | 2/2003 | Tran et al. | 713/168 |
| 2003/0074357 A1 * | 4/2003 | Nielsen et al. | 707/9 |
| 2003/0105966 A1 * | 6/2003 | Pu et al. | 713/186 |
| 2003/0200172 A1 * | 10/2003 | Randle et al. | 705/39 |
| 2004/0128546 A1 * | 7/2004 | Blakley et al. | 713/201 |
| 2004/0210771 A1 * | 10/2004 | Wood et al. | 713/201 |
| 2005/0025125 A1 * | 2/2005 | Kwan | 370/352 |
| 2005/0080914 A1 * | 4/2005 | Lerner et al. | 709/230 |

(Continued)

OTHER PUBLICATIONS

Nagaratnam, N., et al, 'The Security Architecture for Open Grid Services', Jul. 17, 2002, Version 1, entire document, http://www.cs.virginia.edu/~humphrey/ogsa-sec-wg/OGSA-SecArch-v1-07192002.pdf.*

(Continued)

*Primary Examiner* — Edan Orgad
*Assistant Examiner* — Ronald Baum
(74) *Attorney, Agent, or Firm* — Myers Bigel Sibley & Sajovec

(57) ABSTRACT

A method of providing data communications between first and second computing devices over a data network may include receiving a request for data communication at the first computing device from the second computing device over the data network. After receiving the request for data communication, a request for a credential according to an authentication standard may be transmitted from the first computing device to the second computing device, and the request for the credential may identify the authentication standard. After transmitting the request for the credential according to the authentication standard, a credential according to the authentication standard may be received, and the credential maybe verified. Responsive to receiving the request for data communication and responsive to verifying the authentication credential, the requested data communication may be allowed.

18 Claims, 4 Drawing Sheets

U.S. PATENT DOCUMENTS

| | | | | |
|---|---|---|---|---|
| 2005/0086297 A1* | 4/2005 | Hinks | ............................ | 709/203 |
| 2005/0144452 A1* | 6/2005 | Lynch et al. | .................... | 713/170 |
| 2005/0202392 A1* | 9/2005 | Allen et al. | ..................... | 434/362 |
| 2005/0204051 A1* | 9/2005 | Box et al. | ........................ | 709/230 |
| 2005/0210252 A1* | 9/2005 | Freeman et al. | .............. | 713/171 |
| 2005/0246427 A1* | 11/2005 | Ishii | ............................... | 709/213 |
| 2006/0053124 A1* | 3/2006 | Nishio et al. | ................... | 707/100 |
| 2006/0080352 A1* | 4/2006 | Boubez et al. | ................. | 707/102 |
| 2006/0168215 A1* | 7/2006 | McIntyre | ....................... | 709/225 |

OTHER PUBLICATIONS

Nagaratnam, N., et al, 'The Security Architecture for Open Grid Services', Jul. 17, 2002, Version 1, entire document, http://www.di.unipi.it/~coppola/GRIDsem/OGSA-SecArch-v1-07192002.pdf.*

Kerberos: The Network Authentication Protocol; http://web.mit.edu/kerberos/www/.

Kerberos (protocol); http://en.wikipedia.org/wiki/Kerberos_(protocol)_(Wikipedia).

Clifford Neuman: Kerberos: An Authentication Service for Computer Networks; http://www.isi.edu/gost/publications/kerberos-neuman-tso.html; 1994 Institute of Electrical and Electronics Engineers. (USC/ISI Technical Report No. ISI/RS 94-399.

Scott Seely (Microsoft Corporation) Using SOAP Faults; http://msdn.microsolft.com/library/en-us/dnservice/html/service09172002.asp?frame=true Sep. 20, 2002.

SOAP Fault Element; The Optional SOAP Fault element is used to hold error and status information for a SOAP message; http://www.w3schools.com/SOAP/soap_fault.asp.

"Extending SSH Authentication Protocol with RSA Secure ID"; California Software Laboratories; http://www.cswl.com/whiteppr/white/ssh.html.

Microsoft Internet Explorer 6 Resource Kit; "Chapter 6—Digital Certificates".

* cited by examiner

ADAPTIVE AUTHENTICATION METHODS, SYSTEMS, DEVICES, AND COMPUTER PROGRAM PRODUCTS

FIELD OF THE INVENTION

The present invention relates generally to data communications, and more particularly to methods of providing security for data communications and related systems and computer program products.

BACKGROUND

Digital data communications may be provided between two computing devices (such as a client device and a server device) over a data network (such as the Internet). Accordingly, some form of authentication may be used to protect against unauthorized data transfer. For example, a client device may request data from a server device, and the server device may require authentication of the client device and/or a credential for the client device before providing the requested data.

Authentication may be provided, for example, by assigning a username and password to the client device with the username and password being known to the server device. Upon the client device requesting data from the server device, the server device may request the username and password for the client device. The data transfer may be allowed to proceed if the correct combination of username and password is provided by the client device. If the correct combination of username and password is not provided by the client device, the server device may block the requested data transfer. A username/password may thus serve as a credential used to authenticate a client device wherein the username/password is assigned by one of the client device and/or the server device.

Authentication of the client device may also be provided using a certificate. A certificate is a digital document that vouches for the identity and ownership of an individual, a computer system, a specific server running on that system, or an organization. For example, a certificate of a user and/or a computing device may verify that a particular public key is assigned to the user and/or computing device. The X.509 standard is one of many standards that defines what information can go into a certificate and describes the data format of that information. A trusted third party may issue. certificates to authenticated persons and/or client devices, and the trusted third party may validate certificates presented by a server device. Digital certificates are discussed, for example, in U.S. Pat. No. 6,775,782 entitled *System And Method For Suspending And Resuming Digital Certificates In A Certificate-Based User Authentication Application System*. Digital certificates are also discussed in U.S. Pat. No. 6,823,452 entitled *Providing End-To-End User Authentication For Host Access Using Digital Certificates*. The disclosures of both of these patents are hereby incorporated herein in their entirety by reference. A digital certificate may thus serve as a credential used to authenticate a client device wherein the digital certificate is assigned by a third party certification authority.

Authentication of the client device may be provided using other network authentication standards such as Kerberos. The Kerberos network authentication standard is discussed, for example, in the reference by B. Clifford Neuman, et al. entitled *Kerberos: An Authentication Service For Computer Networks*, USC/ISI Technical Report number ISI/RS-94-399, IEEE Communications Magazine, Vol. 32, No. 9, pages 33-38, September 1994. The disclosure of the Neuman et al. reference is hereby incorporated herein in its entirety by reference. According to the Kerberos standard, a secure token is issued by a third party certification authority for a single use.

Authentication of the client device may be provided using still other network authentication standards such as a secure ID token standard. A secure ID token standard uses individually registered devices that generate single-use passcodes (tokens) which change based on a time code algorithm. A secure ID token standard is discussed, for example, in *Extending SSH Authentication Protocol With RSA Secure ID*, California Software Laboratories, (http://www.cswl.com/whiteppr/white/ssh.html).

SUMMARY

According to some embodiments of the present invention, methods of providing data communications between first and second computing devices over a data network may include receiving a request for data communication at the first computing device from the second computing device over the data network. After receiving the request for data communication, a request for a credential according to an authentication standard may be transmitted from the first computing device to the second computing device, and the request for the credential may identify the authentication standard. After transmitting the request for the credential according to the authentication standard, a credential according to the authentication standard may be received, and the credential may be verified. Responsive to receiving the request for data communication and responsive to verifying the authentication credential, the requested data communication may be allowed.

In addition, a second request for data communication may be received at the first computing device from the second computing device over the data network after allowing the requested data communication. After receiving the second request for data communication, a request for a second credential according to a second authentication standard may be transmitted from the first computing device to the second computing device, and the first and second authentication standards may be different. After transmitting the request for the second credential according to the second authentication standard, a second credential according to the second authentication standard may be received, and the second credential may be verified. Responsive to receiving the second request for data communication and responsive to verifying the second authentication credential, the second requested data communication may be allowed.

For the example, the first credential according to the first authentication standard may be a credential assigned by one of the first and/or second computing devices, and the second credential according to the second authentication standard may be a credential assigned by a certification authority independent of both of the first and second computing devices. In an alternative, the first credential according to the first authentication standard may be a credential assigned by a certification authority independent of both of the first and second computing devices, and the second credential according to the second authentication standard may be a credential assigned by one of the first and/or second computing devices. In other alternatives, the first credential according to the first authentication standard may be assigned by a first certification authority, the second credential according to the second authentication authority may be assigned by a second certification authority, the first and second certification authorities may be different, and the first and second certification authorities may be independent of both of the first and second computing devices. In still other alternatives, the first credential may be one of a digital certificate, a username/password, a secure token, a mobile network secret, a public/private key, and/or a ticket according to the first authentication standard, and the second credential may be one of a digital certificate, a username/password, a secure token, a mobile network secret, a public/private key, and/or a ticket according to the second authentication standard.

More particulary, transmitting a request for a credential may include transmitting the request in a fault message, such as a Simple Object Access Protocol (SOAP) fault message, from the first computing device to the second computing device. Moreover, the first computing device may be a server computing device, the second computing device may be a client computing device, and the data network may include the Internet.

According to additional embodiments of the present invention, methods of providing data communications.between first and second computing devices over a data network may include transmitting a request for data communication from the first computing device to the second computing device over the data network. After transmitting the request for data communication, a request for a credential according to an authentication standard may be received from the second computing device at the first computing device, and the request for the credential may identify the authentication standard. After receiving the request for the credential according to the authentication standard, a credential according to the authentication standard may be transmitted. After transmitting the credential, the requested data communication may be provided.

In addition, a second request for data communication may be transmitted from the first computing device to the second computing device after providing the requested data communication. After transmitting the second request for data communication, a request for a second credential according to a second authentication standard may be received from the second computing device at the first computing device, and the first and second authentication standards may be different. After receiving the request for the second credential according to the second authentication standard, a second credential according to the authentication standard may be transmitted. After transmitting the second credential, the second requested data communication may be provided.

The first credential according to the first authentication standard may be a credential assigned by one of the first and/or second computing devices, and the second credential according to the second authentication standard may be a credential assigned by a certification authority independent of both of the first and second computing devices. In an alternative, the first credential according to the first authentication standard may be a credential assigned by a certification authority independent of both of the first and second computing devices, and the second credential according to the second authentication standard may be a credential assigned by one of the first and/or second computing devices. In another alternative, the first credential according to the first authentication standard may be assigned by a first certification authority, the second credential according to the second authentication authority may be assigned by a second certification authority, the first and second certification authorities may be different, and the first and second certification authorities may be independent of both of the first and second computing devices. In still another alternative, the first credential may be one of a digital certificate, a username/password, a secure token, a mobile network secret, a public/private key, and/or a ticket according to the first authentication standard, and the second credential may be one of a digital certificate, a username/password, a secure token, a mobile network secret, a public/private key, and/or a ticket according to the second authentication standard.

Moreover, receiving a request for a credential may include receiving the request in a fault message, such as a Simple Object Access Protocol (SOAP) fault message, at the first computing device from the second computing device. In addition, the first computing device may include a client computing device, the second computing device may include a server computing device, and the data network may include the Internet.

According to still additional embodiments of the present invention, a computer program product may provide data communications between first and second computing devices over a data network. The computer program product may include a computer readable medium having computer readable program code embodied therein. Moreover, the computer readable program code may include computer readable program code configured to receive a request for data communication at the first computing device from the second computing device over the data network. Computer readable program code may also be configured to transmit a request for a credential according to an authentication standard from the first computing device to the second computing device after receiving the request for data communication, and the request for the credential may identify the authentication standard. In addition, computer readable program code may be configured to receive a credential according to the authentication standard after transmitting the request for the credential according to the authentication standard, and to verify the credential. Moreover, computer readable program code may be configured to allow the requested data communication responsive to receiving the request for data communication and responsive to verifying the authentication credential.

According to yet additional embodiments of the present invention, a computer program product may provide data communications between first and second computing devices over a data network. The computer program product may include a computer readable medium having computer readable program code embodied therein. Moreover, the computer readable program code may include computer readable program code configured to transmit a request for data communication from the first computing device to the second computing device over the data network. In addition, computer readable program code may be configured to receiving a request for a credential according to an authentication standard from the second computing device at the first computing device after transmitting the request for data communication, and the request for the credential may identify the authentication standard. Moreover, computer readable program code may be configured to transmit a credential according to the authentication standard after receiving the request for the credential according to the authentication standard, and to provide the requested data communication after transmitting the credential.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
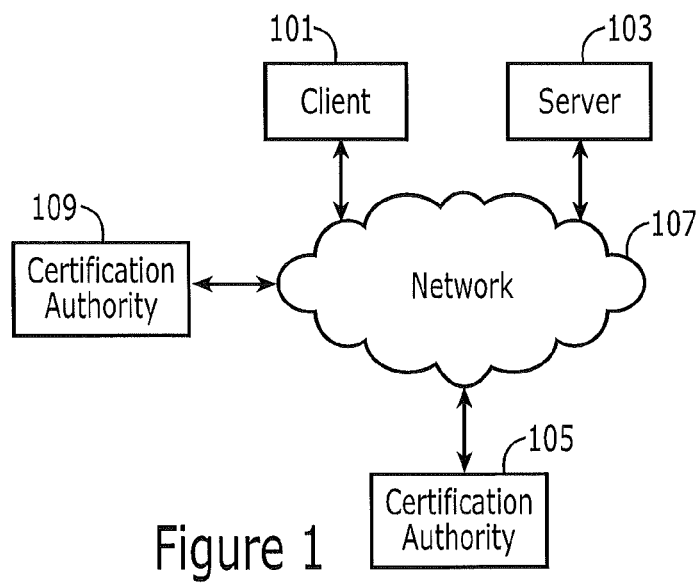
FIG. 1 is a block diagram illustrating network systems and methods according to embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 block diagram illustrating a data information system according to embodiments of the present invention. A data network 107, such as the Internet, may provide coupling between any number of computing devices. As shown in FIG. 1, for example, two computing devices such as client computing device 101 and server computing device 103 may be coupled over the data network 107 so that the server computing device 103 may provide a data transfer to the client computing device 101 responsive to a request received from the client computing device 101. While the computing device 101 has been designated as a "client" device and the computing device 103 has been designated as a "server" device for the purposes of discussion herein, it will be understood that a same computing device can be a client computing device at some times and a server computing device at other times depending on the fictions being performed. Moreover, during an exchange between two computing devices, a first computing device may be a client computing device and a second computing device may be a server computing device during one period, and the first computing device may be a server computing device and the second computing device may be a client computing device during another period. In general, a client computing device is a device requesting a data transfer, and a server computing device is a device providing data for the data transfer.

When a data communication is initiated between two computing devices over the data network 107, authentication may be performed to confirm that the requesting computing device is authorized to receive the data transfer and to reduced the risk of unauthorized access to the data transfer. When the client computing device 101 requests a data transfer from the server computing device 103, for example, the server computing device 103 may require that the client computing device 101 provide a credential(s) used to verify that the client computing device 101 has the appropriate authorization to receive the data transfer. A credential such as a username/password may be assigned to the client computing device 101 for access to the server computing device 103, and access to the server computing device 103 may be blocked until the client computing device 101 provides an assigned username/password combination. The username/password, for example, may be assigned to the client computing device 101 by the server computing device 103.

One or more third party certification authorities 105 and 107 may also be coupled to the data network 107. A credential for network security can thus be provided by a certification authority independent of both of the client computing device 101 and the server computing device 103. The certification authority 105, for example, may issue a credential for the client computing device 101, and upon receipt of the credential received at the server computing device 103 from the client computing device 101, the server computing device 103 may verify the credential through the certification authority 105 before allowing the requested data transfer to the client computing device 101. Moreover, the certification authorities 105 and 107 may issue credentials according to different authentication standards. For example, the certification authority 105 may issue a credential such as a digital certificate, a secure token, a public/private key, or a ticket according to a first authentication standard, and the certification authority 107 may issue a credential such as a digital certificate, a secure token, a public/private key, or a ticket according to a second authentication standard different than the first authentication standard.

More particularly, the client computing device 101 may transmit a first request for a first data communication over the data network 107, and the first request may be received at the server computing device 103. After receiving the first request for data communication, the server computing device 103 may transmit a first request for a credential according to a first authentication standard to the client computing device 101 wherein the first request for the credential identifies the first authentication standard. The first request for the credential identifying the first authentication standard may then be received at the client computing device 101. More particularly, the first request for a credential may be transmitted as a fault message such as a fault message according to the Simple Object Access Protocol (SOAP).

Responsive to receiving the first request for the credential, the client computing device 101 may transmit a first credential according to the first authentication standard, and the first credential may be received at the server computing device 103. The server computing device 103 may then verify the first credential received from the client computing device 101, and if the first credential received from the client computing device 101 is verified, the server computing device 103 may allow the first requested data communication which may then be provided between the server computing device 103 and the client computing device 101.

At another time, the client computing device 101 may transmit a second request for a second data communication over the data network 107, and the second request may be received at the server computing device 103. After receiving the second request for data communication, the server computing device 103 may transmit a second request for a credential according to a second authentication standard to the client computing device 101 wherein the second request for the credential identifies the second authentication standard. Moreover, the first and second authentication standards may be different. The second request for the credential identifying the second authentication standard may then be received at the client computing device 101. More particularly, the second request for a credential may be transmitted as a fault message such as a fault message according to the Simple Object Access Protocol (SOAP).

Responsive to receiving the second request for the credential, the client computing device 101 may transmit a second credential according to the second authentication standard, and the second credential may be received at the server computing device 103. The server computing device 103 may then verify the second credential received from the client computing device 101, and if the second credential received from the client computing device 101 is verified, the server computing device 103 may allow the second requested data communication which may then be provided between the server computing device 103 and the client computing device 101.

The credential according to the first authentication standard may be one of a digital certificate, a username/password, a secure token (such as a Kerberos secure token or a secure ID token generated by a physical device including a random number generator), a mobile network secret, a public/private key, and/or a ticket. The credential according to the second authentication standard may be another of a digital certificate, a username/password, a secure token (such as a Kerberos secure token or a secure ID token generated by a physical device including a random number generator), a mobile network secret, a public/private key, and/or a ticket.

For Example, the first credential according to the first authentication standard may be a credential assigned by one of the client and/or server computing devices 101 and 103, and the second credential according to the second authentication standard may be a credential assigned by a certification authority 105 independent of both of the client and server computing devices 101 and 103. In an alternative, the first credential according to the first authentication standard may be a credential assigned-by a certification authority 105 independent of both of the client and server computing devices 101 and 103, and the second credential according to the second authentication standard may be a credential assigned by one of the client and/or server computing devices 101 and/or 103. In yet another alternative, the first credential according to the first authentication standard may be assigned by a first certification authority 105, the second credential according to the second authentication authority may be assigned by a second certification authority 109, the first and second certification authorities 105 and 109 may be different, and the first and second certification authorities may be independent of both of the client and server computing devices 101 and 103.

By providing the request for a credential according to a particular authentication standard when a data communication is requested, different authentication standards may be used for data communications between the same two computing devices at different times. The server computing device 103 may require credentials according to different authentication standards at different times to provide different levels of security. The server computing device 103, for example, may require credentials according to different authentication standards at different times to accommodate requests for different types of data communications requiring different levels of security. In addition or in an alternative, the server computing device 103 may require credentials according to different authentication standards at different times to accommodate different levels of security risk, such as different levels of Homeland Security Alerts, different risks of electronic attack (e.g., from computer viruses and/or denial of service attacks), etc.

A level of security may thus be runtime adaptable so that authentication standards may be changed without human intervention. Communications between the client and server computing devices 101 and 103 may be automated machine to machine communications such as communications between computer systems of different financial institutions (such as banks) to provide check clearing, and/or communications between computer systems of different telephone companies to provide local telephone number portability.

According to additional embodiments of the present invention, the client computing device 101 may transmit a credential according to a first authentication standard before receiving a request for a credential from the server computing device 103. If the credential according to the first authentication is acceptable, the data communication may be provided without requiring a request from the server computing device 103 thereby reducing processing overhead. If the credential according to the first authentication standard is not acceptable, the server computing device 103 may then transmit the request for a credential according to a currently acceptable authentication standard. In an environment where the authentication standard does not change frequently, the client computing device 101 can present a credential(s) according to a known authentication standard for a plurality of data communications with the server computing device 103 without requiring a request for a credential from the server computing device 103 identifying the authentication standard, until the authentication standard required by the service device 103 changes.

More particularly, the client computing device 101 may transmit a first credential according to a first authentication standard, and the first credential according to the first authentication standard may be received by the server computing device 103. The first authentication standard, for example, may be an authentication standard that has been previously acceptable to the server computing device 103. If the first authentication standard is still acceptable to the server computing device 103, the-requested data communication may be allowed by the server computing device 103.

If the first authentication standard is no longer acceptable to the server communications device 103, the server computing device 103 may then transmit a request for a second credential according to a second (currently acceptable) authentication standard different than the first authentication standard. Moreover, the request for the second credential may include an identification of the second authentication standard, and the request for the second credential may be received at the client computing device 101. In response to the request for a second credential according to the second authentication standard, the client computing device may obtain a credential according to the second authentication standard, and transmit the credential according to the second authentication standard to the server computing device 103. More particularly, the client computing device 101 may obtain the second credential from one of the certification authorities 105 or 109 over the network 107.

The second credential may be received at the server computing device 103, and if the second credential is verified at the server computing device 103, the requested data communication with the client computing device 101 may be allowed. If the second credential is not verified, the server computing device 101 may block the requested data communication. If the client computing device 101 obtained the second credential from one of the certification authorities 105 or 109, the server computing device 103 may verify the second credential using the certification authority 105 or 109 from which the credential was obtained.

Figure 2:
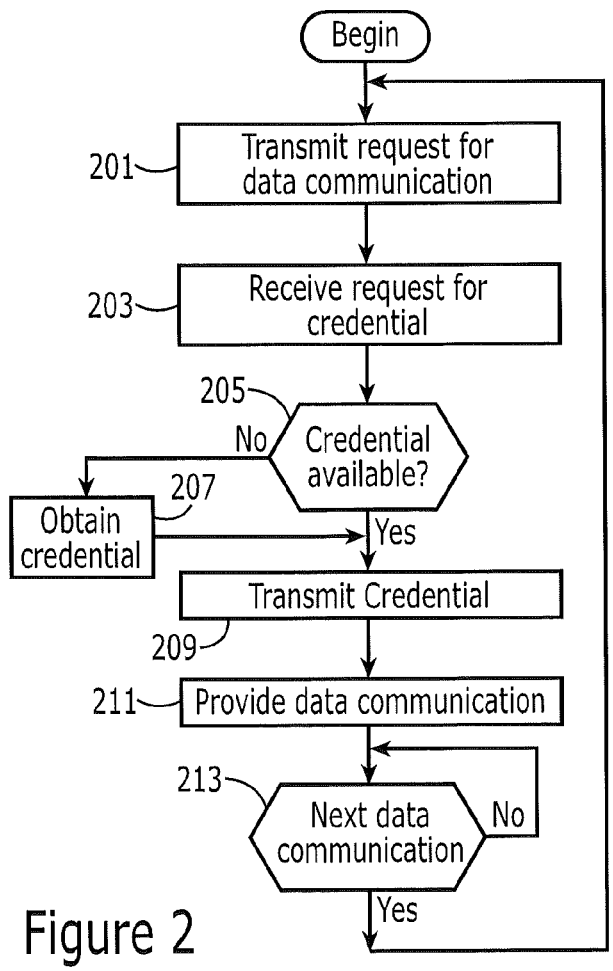
FIG. 2 and 3 flow charts illustrating operations of client and server devices providing authentication for a data communication according to some embodiments of the present invention.
Figure 3:
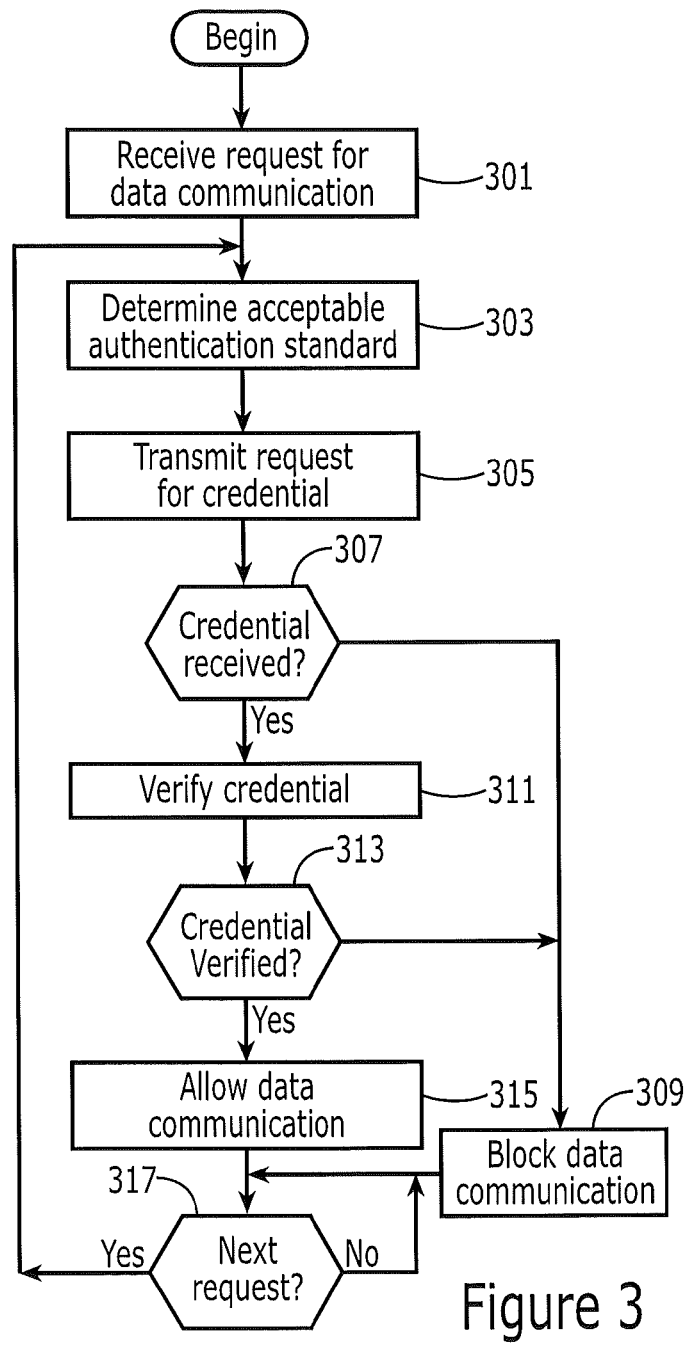

FIG. 2 and 3 are flow charts illustrating operations of the client and server computing devices 101 and 103 according to some embodiments of the present invention. As shown in FIG. 2, the client computing device 101 may transmit a request for data communication from to the server computing device 103 over the data network at block 201. After transmitting the request for data communication, the client computing device 101 may receive a request for a credential according to an authentication standard from the server computing device 103 at block 203 wherein the request for the credential identifies the authentication standard.

At block 205, the client computing device 101 may determine if a credential according to the currently required authentication standard is available. If a credential according to the currently required authentication standard is not available, the client computing device 101 may obtain a credential according to the currently required authentication standard at block 207, and then transmit the credential according to the currently required authentication standard to the server computing device 103 at block 209. For example, the client computing device 101 may obtain the credential from an independent certification authority. If a credential according to the currently required authentication standard is available at block 205, the client computing device 101 may transmit the available credential to the server computing device 103. If the server computing device verifies the credential, the requested data communication may be provided at block 211.

Once the requested data communication is complete, the client computing device 101 may wait for a next data communication at block 213, and operations of FIG. 2 may be repeated for any number of data communications. For each data communication, the client computing device may thus receive a request at block 203 for a credential according to a currently required authentication standard wherein the request identifies the currently required authentication standard, and the currently required authentication standard may change for different data communication sessions with a same server computing device.

When a next data communication is desired at block 213 for the client computing device 101, the client computing device 101 may transmit a second request for data communication to the server computing device 103 at block 201. The client computing device 101 may then receive a request for a second credential according to a second authentication standard at block 203 from the server computing device 103, and the first and second authentication standards may be different.

Because the required authentication standard has changed from the previous data communication, a credential according to the new authentication standard may not be available at block 205, and the client computing device 101 may need to obtain a second credential according to the new authentication standard at block 207. The second credential according to the second authentication standard may then be transmitted to the server computing device 103. If the second credential according to the second authentication standard is verified by the server computing device 103, the second data communication between client and server devices 101 and 103 may be provided at block 211. Otherwise, the second data communication may be blocked.

As shown in FIG. 3, the server computing device 103 may receive a request for data communication at block 301 from the client computing device 101 over the data network 107. At block 303, the server computing device 103 may determine a current acceptable authentication standard. The currently acceptable authentication standard, for example, may be determined based on a level of risk associated with the requested data communication, a level of risk associated with a current security code such as a Homeland Security Threat code level, a level of risk associated with computer virus and/or denial of service attacks, etc. The server computing device 103 may then transmit a request for a credential according to the currently acceptable authentication standard to the client computing device 101 at block 305, and the request for the credential may identify the currently acceptable authentication standard.

At block 307, the server computing device 103 may determine if a credential according to the currently acceptable authentication standard is received from the client computing device 101. If a credential according to the currently acceptable authentication standard is not received at block 307, the server computing device 103 may block the requested data communication at block 309. If a credential according to the currently acceptable standard is received, the server computing device 103 may verify the received credential at block 311. If the credential is verified at block 313, the server computing device 103 may allow the data communication at block 315. If the credential is not verified at block 313, the server computing device 103 may block the data communication at block 309.

Once the data communication is complete, the server computing device 103 may wait for a request for a next data communication at block 317. On receiving a request for a next data communication at block 317, operations of blocks 303-315 may be repeated. If a currently acceptable authentication standard has changed, the request of block 305 may be changed to reflect the new authentication standard.

Figure 4:
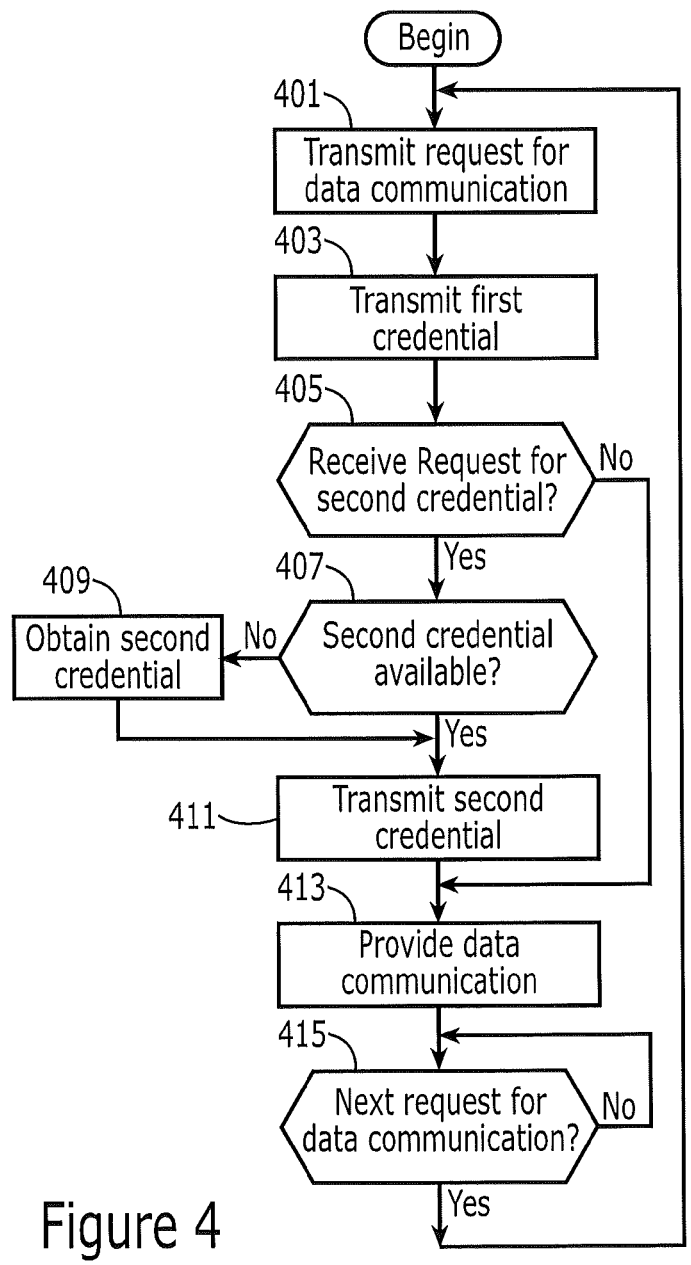
FIG. 4 and 5 flow charts illustrating operations of client and server devices providing authentication for a data communication according to some additional embodiments of the present invention.
Figure 5:
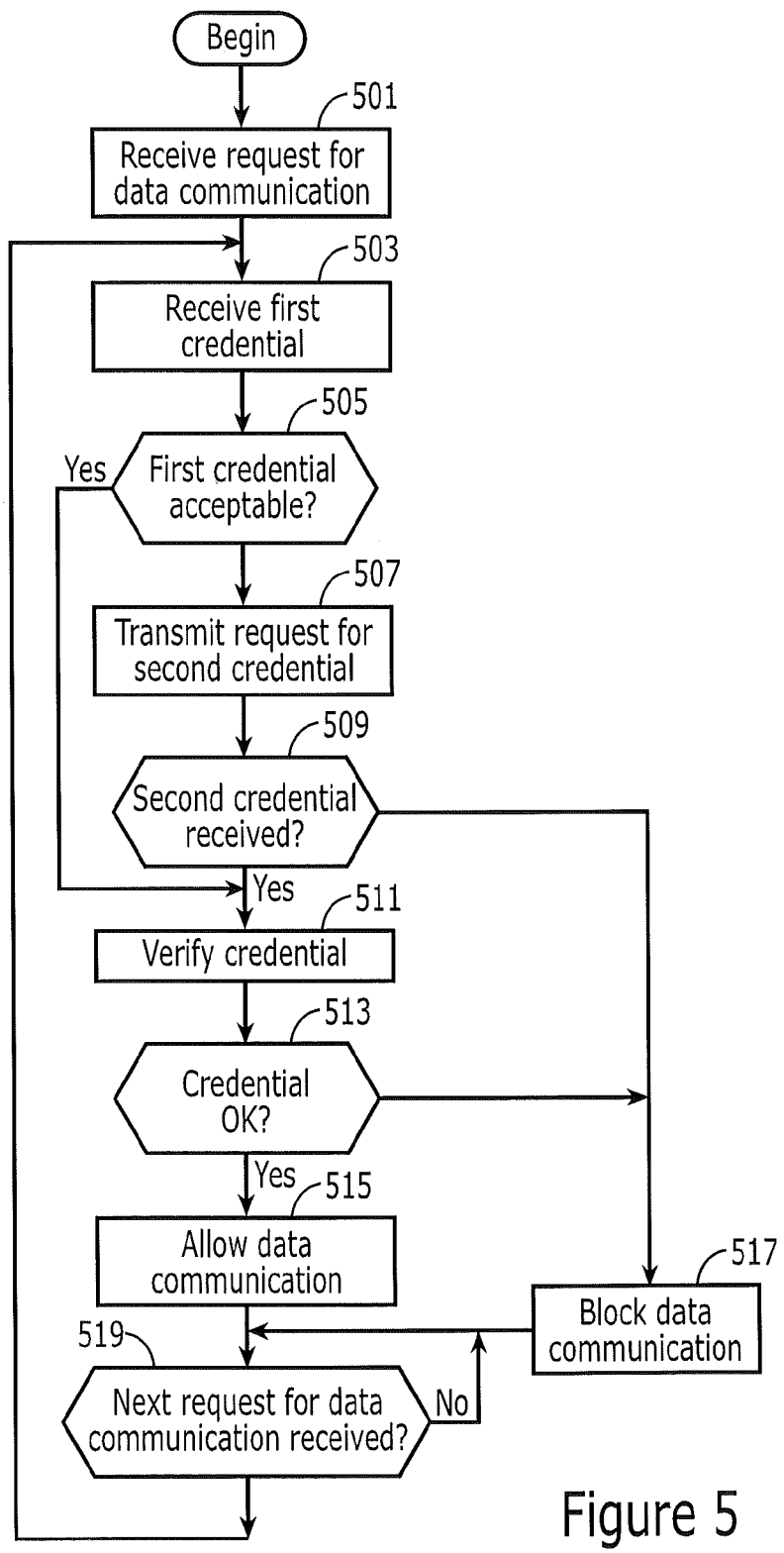

FIG. 4 and 5 are flow charts illustrating operations of the client and server computing devices 101 and 103 according to some additional embodiments of the present invention. As shown in FIG. 4, the client computing device 101 may transmit a request for a data communication to the server computing device 103 at block 401, and the client computing device may transmit a first credential according to a first authentication standard to the server computing device 103 at block 403. While blocks 401 and 403 are shown separately, the request and the credential may be transmitted in a single communication or in separate communications. Accordingly, a first credential according to a first authentication standard may be transmitted from the client computing device 101 to the server computing device 103 before receiving a request from the server computing device 103. If the first credential is accepted by the server computing device 103, no request for a second credential will be received at the client computing device 101, and the data communication may be provided at block 409.

If the first credential is not accepted by the server computing device 103, the client computing device 101 may receive a request for a second credential according to a second authentication standard from the server computing device 103 at block 405. More particularly, the request for the second credential may identify the second authentication standard, and the first and second authentication standards may be different. If a second credential according to the second authentication standard is not available at block 407, the client computing device 101 may obtain a second credential according to the second authentication standard at block 409, and the second credential may be transmitted to the server computing device 103 at block 411. The second credential, for example, may be obtained at block 409 from an independent certification authority 105 or 109. If a second credential according to the second authentication standard is available at block 407, the second credential may be transmitted at block 411 without performing the additional operation of obtaining the second credential. If the server computing device 103 verifies the second credential, the requested data communication may be provided at block 413.

Once the requested data communication is complete, the client computing device 101 may wait for a next data communication at block 415, and operations of FIG. 4 may be repeated for any number of data communications. For each data communication, the client computing device 101 may thus transmit a credential according to a last used authentication standard before receiving a request for a credential. Processing overhead can thus be reduced when an authentication standard remains unchanged over a plurality of data communications.

As shown in FIG. 5, the server computing device 103 may receive a request for a data communication from the client computing device 101 at block 501, and the server computing device 103 may receive a first credential according to a first authentication standard from the client computing device at block 503. While the blocks 501 and 503 are shown separately, the request for data communication and the credential according to the first authentication standard may be received in a same communication.

At block 505 the server computing device 103 may determine whether or not the first authentication standard is currently acceptable. If the first authentication standard is currently acceptable at block 505, the server computing device 103 may proceed to verify the first credential at block 511. If the first credential is verified at block 513, the server computing device 103 my allow the requested data communication at block 515. If the first credential is not verified at block 513, the server computing device 103 may block the requested data communication at block 517.

If the first authentication standard is not currently acceptable at block 505, the server computing device 103 may transmit a request for a second credential according to a second authentication standard to the client computing device 101 at block 507. More particularly, the request for the second credential may identify the second authentication standard. If a credential according to the second authentication standard is not received at block 509, the server computing device 103 may block the data communication at block 517.

If a second credential according to the second authentication standard is received at block 509, the server computing device 103 may proceed to verify the second credential at block 511. If the second credential is verified at block 513, the server computing device 103 my allow the requested data communication at block 515. If the second credential is not verified at block 513, the server computing device 103 may block the requested data communication at block 517.

Once the data communication is complete, the server computing device 103 may wait for a request for a next data communication at block 519. On receiving a request for a next data communication at block 519, operations of blocks 503-517 may be repeated. If a currently acceptable authentication standard has changed, the request of block 507 may be changed to reflect the new authentication standard.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims.

That which is claimed is:

1. A method of providing data communications between a server computing device and a client computing device over a data network, the method comprising:
    receiving a first request for data communication at the server computing device from the client computing device over the data network;
    responsive to receiving the first request for data communication, transmitting a request for a first authentication credential according to a first authentication standard from the server computing device to the client computing device, wherein the request for the first authentication credential identifies the first authentication standard;
    after transmitting the first request for the first authentication credential according to the first authentication standard, receiving a first authentication credential from the client computing device at the server computing device according to the first authentication standard responsive to the request for the first authentication credential;
    verifying the first authentication credential responsive to receiving the first authentication credential;
    responsive to receiving the first request for data communication and responsive to verifying the first authentication credential, providing the first requested data communication from the server computing device to the client computing device;
    after providing the first requested data communication, receiving a second request for data communication at the server computing device from the client computing device over the data network;
    responsive to receiving the second request for data communication, transmitting a request for a second authentication credential according to a second authentication standard from the server computing device to the client computing device, wherein the request for the second authentication credential identifies the second authentication standard and the first and second authentication standards are different;
    after transmitting the request for the second authentication credential according to the second authentication standard, receiving a second authentication credential from the client computing device at the server computing device according to the second authentication standard responsive to the request for the second authentication credential;
    verifying the second authentication credential responsive to receiving the second authentication credential; and
    responsive to receiving the second request for data communication and responsive to verifying the second authentication credential, providing the second requested data communication from the server computing device to the client computing device;
    wherein the data network comprises the Internet;
    wherein transmitting the request for the first authentication credential comprises transmitting the request for the first authentication credential from the server computing device in a first fault message according to a simple object access protocol identifying the first authentication standard; and
    wherein transmitting the request for the second authentication credential comprises transmitting the request for the second authentication credential from the server computing device in a second fault message according to the simple object access protocol identifying the second authentication standard.

2. A method according to claim 1 wherein the first authentication credential comprises a credential assigned by at least one selected from the group consisting of the server computing device and the client computing device, and wherein the second authentication credential comprises a credential assigned by a certification authority independent of both of the server and client computing devices.

3. A method according to claim 1 wherein the first authentication credential comprises a credential assigned by a certification authority independent of both of the server and client computing devices and wherein the second authentication credential comprises a credential assigned by at least one selected from the group consisting of the server and client computing devices.

4. A method according to claim 1 wherein the first authentication credential is assigned by a first certification authority, wherein the second authentication credential is assigned by a second certification authority, wherein the first and second certification authorities are different, and wherein the first and second certification authorities are independent of both of the server and client computing devices.

5. A method according to claim 1 wherein the first authentication credential comprises at least one selected from the group consisting of a digital certificate, a username, a password, a secure token, a mobile network secret, a public key, a private key, and a ticket according to the first authentication standard, and wherein the second authentication credential comprises at least one selected from the group consisting of a digital certificate, a username, a password, a secure token, a mobile network secret, a public key, a private key, and a ticket according to the second authentication standard.

6. A method according to claim 1 wherein transmitting a request for a first or second authentication credential comprises transmitting the request in a fault message from the server computing device to the client computing device.

7. A method according to claim 1 further comprising:
    before transmitting the request for a first authentication credential according to the first authentication standard, receiving an authentication credential according to a previous authentication standard; and
    determining that the previous authentication standard is not a currently acceptable authentication standard;
    wherein transmitting the request for a first authentication credential according to the first authentication standard comprises transmitting a request for a credential according to an authentication standard different than the previous authentication standard.

8. A method according to claim 1 wherein the first authentication credential according to the first authentication standard and the second authentication credential according to the second authentication standard provide different levels of security for different data communications between the client and server computing devices.

9. A method according to claim 8 wherein the first request for data communications includes a request for a first type of data communications, wherein the server computing device is configured to select the first authentication credential according to the first authentication standard to provide a first level of security required for the first type of data, wherein the second request for data communications includes a request for a second type of data communications, wherein the server computing device is configured to select the second authentication credential according to the second authentication standard to provide a second level of security required for the second type of data, wherein the first and second data types are different, and wherein the first and second levels of security are different.

10. A method according to claim 8 wherein the server computing device is configured to select the first authentication credential according to the first authentication standard to provide a first level of security responsive to a first level of security risk, and wherein the server computing device is configured to select the second authentication credential according to the second authentication standard to provide a second level of security responsive to a second level of security risk, wherein the first and second levels of security are different, and wherein the first and second levels of security risk are different.

11. A method of providing data communications between client and server computing devices over a data network, the method comprising:
    transmitting a first request for data communication from the client computing device to the server computing device over the data network;
    after transmitting the first request for data communication, receiving a request for a first authentication credential according to a first authentication standard from the server computing device at the client computing device, wherein the request for the first authentication credential identifies the first authentication standard, and wherein the request for the first authentication credential is responsive to the first request for data communication;
    responsive to receiving the request for the first authentication credential according to the first authentication standard, transmitting a first authentication credential according to the first authentication standard;
    after transmitting the first authentication credential, receiving the first requested data communication responsive to the first request for data communication and responsive to the first authentication credential;
    after receiving the first requested data communication, transmitting a second request for data communication from the client computing device to the server computing device;
    after transmitting the second request for data communication, receiving a request for a second authentication credential according to a second authentication standard from the server computing device at the client computing device, wherein the first and second authentication standards are different, and wherein the request for the second authentication credential is responsive to the second request for data communication;
    responsive to receiving the request for the second authentication credential according to the second authentication standard, transmitting a second authentication credential according to the second authentication standard; and
    after transmitting the second authentication credential, receiving the second requested data communication responsive to the second request for data communication and responsive to the second authentication credential;
    wherein the data network comprises the Internet;
    wherein receiving the request for the first authentication credential comprises receiving the request for the first authentication credential at the client computing device in a first fault message according to a simple object access protocol identifying the first authentication standard; and
    wherein receiving the request for the second authentication credential comprises receiving the request for the second authentication credential at the client computing device in a second fault message according to the simple object access protocol identifying the first authentication standard.

12. A method according to claim 11 wherein the first authentication credential comprises a credential assigned by at least one selected from the group consisting of the client and server computing devices, and wherein the second authentication credential comprises a credential assigned by a certification authority independent of both of the client and server computing devices.

13. A method according to claim 11 wherein the first authentication credential comprises a credential assigned by a certification authority independent of both of the client and server computing devices and wherein the second authentication credential comprises a credential assigned by at least one selected from the group consisting of the client and server computing devices.

14. A method according to claim 11 wherein the first authentication credential is assigned by a first certification authority, wherein the second authentication credential is assigned by a second certification authority, wherein the first and second certification authorities are different, and wherein the first and second certification authorities are independent of both of the client and server computing devices.

15. A method according to claim 11 wherein the first authentication credential comprises at least one selected from the group consisting of a digital certificate, a username, a password, a secure token, a mobile network secret, a public key, a private key, and a ticket according to the first authentication standard, and wherein the second authentication credential comprises at least one selected from the group consisting of a digital certificate, a username, a password, a secure token, a mobile network secret, a public key, a private key, and a ticket according to the second authentication standard.

16. A method according to claim 11 wherein receiving a request for a first or second authentication credential comprises receiving the request in a fault message at the client computing device from the server computing device.

17. A method according to claim 11 further comprising:
    before receiving the request for a first authentication credential according to the first authentication standard, transmitting an authentication credential according to a previous authentication standard; and
    wherein receiving the request for a first authentication credential according to the first authentication standard comprises receiving a request for a credential according to an authentication standard different than the previous authentication standard.

18. A method according to claim 11 wherein the first authentication credential according to the first authentication standard and the second authentication credential according to the second authentication standard provide different levels of security for different data communications between the client and server computing devices.

* * * * *